July 20, 1948.  P. A. NORRIS  2,445,405
APPARATUS FOR MOLDING
Filed June 27, 1944  2 Sheets-Sheet 1
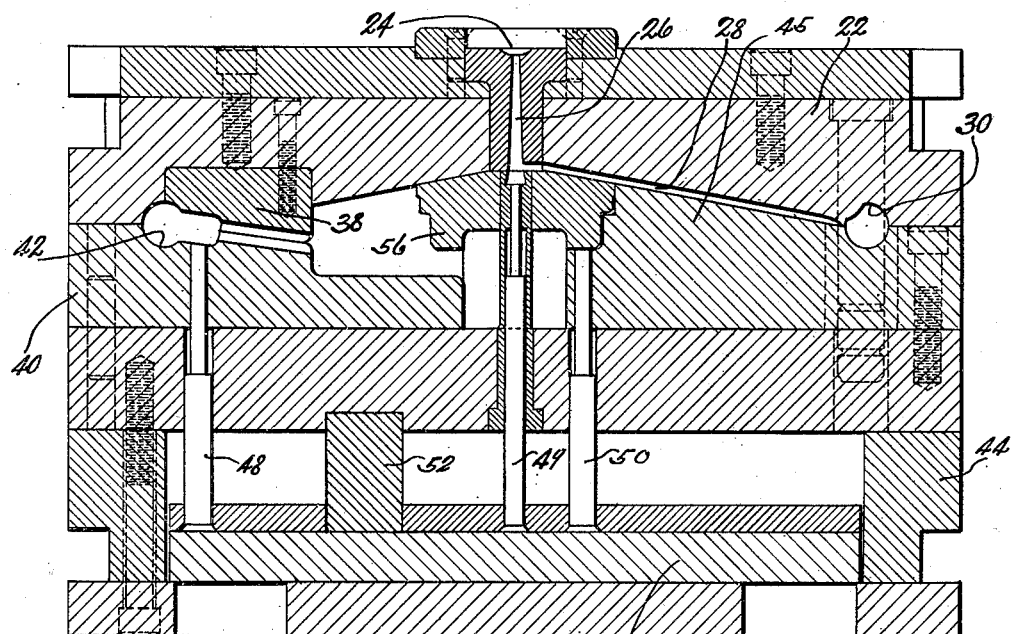
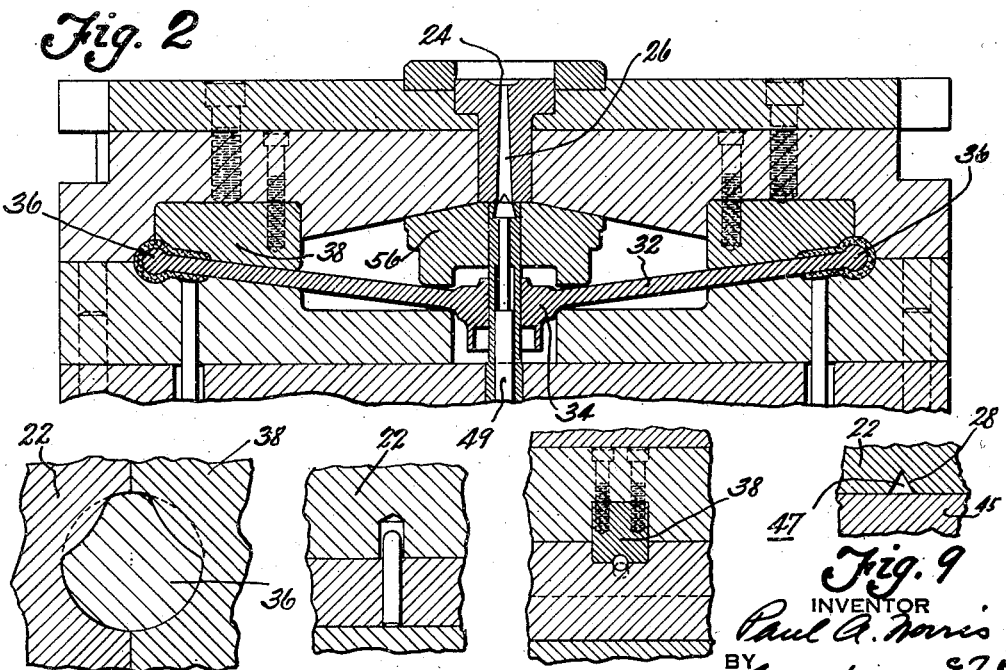

July 20, 1948.  P. A. NORRIS  2,445,405
APPARATUS FOR MOLDING
Filed June 27, 1944  2 Sheets-Sheet 2
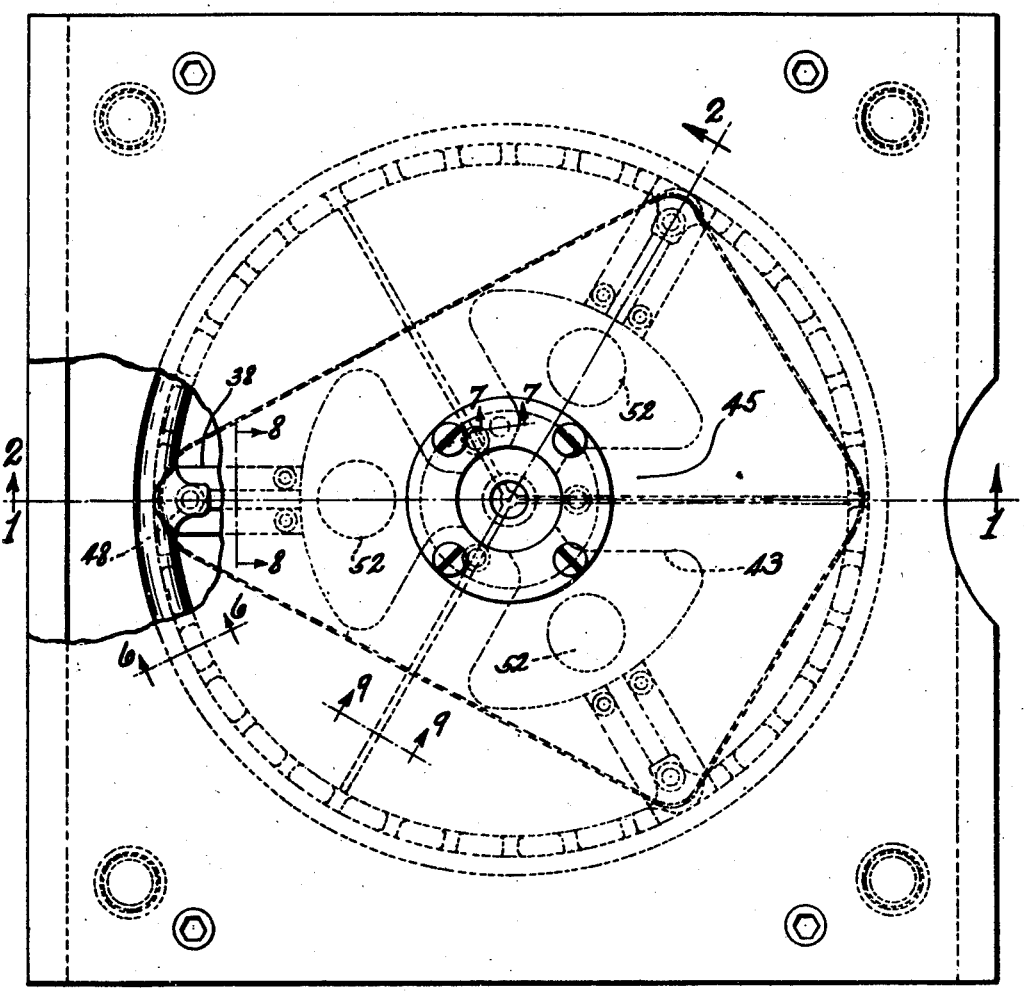
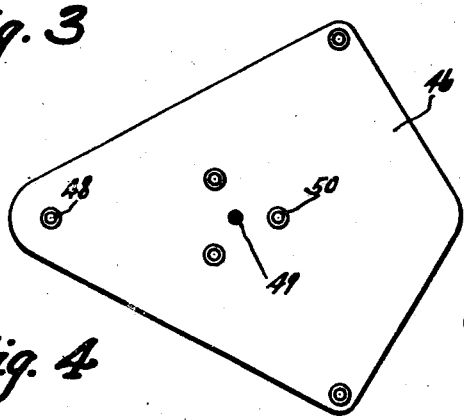

Patented July 20, 1948

2,445,405

UNITED STATES PATENT OFFICE 2,445,405

APPARATUS FOR MOLDING

Paul A. Norris, Dayton, Ohio, assignor to General Motors Corporation, Detroit, Mich., a corporation of Delaware Application June 27, 1944, Serial No. 542,293

2 Claims. (Cl. 18—36)

This invention relates to apparatus for molding plastic materials and in one of the embodiments thereof it is particularly directed to an apparatus wherein steering wheels may be molded by injection molding procedures.

It is an object of the invention to provide a mold or die wherein plastic material may be extruded over a removable segment of the die, which segment acts as a positioning means for a re-enforcing member that is used in the molded object.

More particularly, in carrying out the above object, it is a further object of the invention to provide an apparatus for molding plastic material around the periphery of the spider of a steering wheel wherein a die insert is utilized for holding the spider in place within the mold which insert acts as a portion of the extrusion passage for the plastic during the molding process.

Further objects and advantages of the present invention will be apparent from the following description, reference being had to the accompanying drawings wherein a preferred embodiment of the present invention is clearly shown.

In the drawings:

Fig. 1 is a view in section of the one type of die or mold used in the manufacture of steering wheels and is a section taken on the line 1—1 of Fig. 3;

Fig. 2 is a view in section taken on the line 2—2 of Fig. 3;

Fig. 3 is a plan view of one type of mold or die used in connection with the present invention;

Fig. 4 is a plan view of the ejection plate.

Fig. 5 is a fragmentary view of the ejector pin plate showing the ejector pins;

Fig. 6 is a sectional view taken on the line 6—6 of Fig. 3;

Fig. 7 is a sectional view taken on the line 7—7 of Fig. 3.

Fig. 8 is a sectional view taken on the line 8—8 of Fig. 3 showing one of the cushioning blocks for holding the spider; and Fig. 9 is a sectional view taken on the line 9—9 of Fig. 3 showing the cross section of one of the plastic supply passages connecting the main cavity of the die with the sprue.

In the manufacture of steering wheels, a steel insert or spider is generally provided around which plastic is molded. The spider reenforces the plastic to form a wheel of sufficient strength. In the past these wheels have been manufactured in molds or dies wherein the plastic around the periphery of the wheel is injected into the cavity at points around the periphery necessitating long supply passages and usually three sprue passages. This method of supply was necessary since the spider or re-enforcing insert of steel does not permit a central injection sprue with radially extending supply passages. This is due to the fact that heretofore it was believed impossible to form such a passage in view of the particular nature of the insert. This difficulty was brought about by the central hub of the spider. This invention is directed to a method of molding and apparatus for molding wherein a central supply sprue is used in the molding die and wherein radially extending supply passages are provided from a central sprue. In order to overcome the difficulty of injecting over the hub of the spider a removable die insert is provided which forms supply passages and likewise has the dual function of clamping the spider in place.

Referring to the drawings, and particularly to Fig. 1 a die assembly 20 is shown which includes an upper die block 22 made of a plurality of blocks of steel and having a central supply opening 24 therein which connects with a tapered elongated sprue opening 26. The upper die block 22 includes a plurality of supply passages 28 extending radially from sprue 26. These passages may be any desired number and in the present instance three are shown spaced 120° apart. The upper die block includes a cavity 30 of annular shape which consists of half of the cross section of the finally molded wheel rim desired. The spider used in the steering wheel in the present instance has three spokes 32 radially extending from a central hub 34 and terminating at their outer ends in an annular ring 36 which is welded or otherwise suitably secured to the spokes. The upper die block 22 includes three positioning or cushioning blocks 38 inserted therein which when the spider is in place clamps the spokes thereof in cooperation with a lower die block 40 to hold the spider centrally located within the cavity 30. The lower block 40 includes the remainder of the die cavity as at 42 which portion of the cavity is in the shape of the other half of the finally molded rim of the wheel and fits in a complementary fashion with the cavity 30 in the upper die block. The lower block is recessed in three places as at 44 to permit the spokes of the wheel to pass therethrough. In between these recesses 43 are raised portions 45 which cooperate with the open passages 28 of the upper die block to form a portion of the supply passages 47 which open into the cavity. The passages as will be noted in Fig. 9 are of triangular cross section so that plastic set up therein may be easily removed therefrom. Suitable pins for lining the upper and lower die blocks are provided as is well known in the art.

The lower die member is carried by and secured to a bolster plate 44 which holds the die around the edges thereof and permits the assembly of an ejector plate 46 including a plurality of ejector pins 48, 49 and 50 thereon. The ejector plate is held spaced from the low die member by means of a block or blocks 52 during the molding operation after which the blocks 52 are removed and the plate is forced upwardly to eject the molded wheel from the die cavity. Obviously the upper die member must be removed prior to this ejection.

The central hub 34 of the wheel insert or spider is held clamped in position by means of a die insert 56. This insert when the upper die member 22 is in place is held tightly against the spokes of the spider closely adjacent the hub, as noted in Fig. 2, and is likewise in contact with the upper die block 22. The insert 56 forms the remainder of the supply passages 47 at the cuot-out central portions of the lower die member as shown at 43 in Fig. 3 and in effect forms a continuation of the surfaces 46 of the lower die member.

When plastic is injected in the mold through the opening 24 it passes down through sprue 56 and passages 47 and is distributed at three points around the periphery of the mold cavity, sufficient plastic is supplied to completely cover the spider. Heat may then be applied to the die by means of suitable heating elements etc. After the plastic is set up, the upper die member 22 is removed and the blocks 52 are also removed whereupon the ejector plate 46 is moved upwardly to break the wheel loose from the mold cavity and likewise cause the insert 56 to be forced inwardly by pins 50. Simultaneously with this operation the ejector pin 49 presses the sprue and supply portions upwardly to break them loose from the plates. After the finished wheel is removed from the die the sprue and the supply runners may be broken therefrom and the wheel smoothed off.

From the foregoing it will be manifest that the present invention solves a problem of long standing by permitting the injection of the plastic material over a removable die insert which in itself acts as a clamping means for a metallic insert used in the molded article. This removable die insert permits flow of the plastic thereover by acting as one wall of plastic supply passages. This is very advantageous in the manufacture of a number of articles and particularly steering wheels which heretofore were impossible to make by central injection procedures.

The plastic used in connection with this invention forms no part thereof and may be any suitable plastic, thermosetting or thermoplastic, as the case may be provided such resin can be suitably injection molded to provide the desired results.

While the embodiment of the present invention as herein disclosed, constitutes a preferred form, it is to be understood that other forms might be adopted, all coming within the scope of the claims which follow.

What is claimed is as follows:

1. A mold for use in injection molding of plastic material into annular steering wheels which include a metallic reinforcing spider therein, comprising; a two-part separable mold including a portion of an annular mold cavity in each part thereof so that the completed cavity is formed when the two parts of the mold are placed in juxtaposition, the upper of said mold parts including a single sprue opening in the upper mold part, said opening being located centrally of the upper mold part, three equally spaced grooves in said upper mold part extending radially from said sprue opening, each of said grooves connecting with a portion of the annular cavity carried in said part, positioning means associated with the lower mold part for positioning the reinforcing spider within the mold cavity, a removable mold segment for covering the hub portion of the spider and adapted to fit in a predetermined position with respect to said lower mold part, said removable segment together with said lower mold part closing the grooves in said upper mold part to form closed passages therewith when the two mold parts are in juxtaposition, said segment simultaneously clamping the spider into position due to pressure exerted thereon by the upper mold part whereby plastic material may be injected through said single sprue opening and over said segment for distribution through said closed passages into said cavity and around said spider.

2. Apparatus for injection molding plastic material into a predetermined annular shape around a metallic reinforcing insert, comprising in combination; a two-part mold consisting of separable members each carrying a portion of an annular mold cavity which is completely formed when the members are in juxtaposition, a single sprue opening in the upper mold part, said opening being located centrally of the upper mold part, three equally spaced grooves in said upper mold part extending radially from said sprue opening for connecting the sprue with the cavity, means carried by said lower mold part adjacent said cavity for positioning a metallic reinforcing insert within the cavity, removable clamping means for clamping said metallic insert in position when the upper and lower mold members are juxtapositioned, said clamping means also abutting the lower surface of the upper mold member for forming closed passages with said grooves whereby plastic may be injected over portions of the reinforcing insert through said passages and into said cavity from said central sprue opening.

PAUL A. NORRIS.

REFERENCES CITED

The following references are of record in the file of this patent:

UNITED STATES PATENTS

| Number | Name | Date |
|---|---|---|
| 1,978,985 | Cobb | Oct. 30, 1934 |
| 1,997,074 | Novotny | Apr. 9, 1935 |
| 2,043,584 | Husted | June 9, 1936 |
| 2,304,461 | Knowles | Dec. 8, 1942 |
| 2,356,585 | Hempel | Aug. 22, 1944 |